United States Patent [19]
Ranalli et al.

[11] Patent Number: 5,625,448
[45] Date of Patent: *Apr. 29, 1997

[54] FINGERPRINT IMAGING

[75] Inventors: Eliseo Ranalli, Irvine; Barry G. Broome, Glendora, both of Calif.

[73] Assignee: Printrak International, Inc., Anaheim, Calif.

[*] Notice: The term of this patent shall not extend beyond the expiration date of Pat. No. 5,548,394.

[21] Appl. No.: 436,842

[22] Filed: May 8, 1995

Related U.S. Application Data

[63] Continuation-in-part of Ser. No. 404,931, Mar. 16, 1995.

[51] Int. Cl.[6] .................................................. G06K 9/00
[52] U.S. Cl. ........................................................ 356/71
[58] Field of Search ............................. 356/71; 382/124, 382/127

[56] References Cited

U.S. PATENT DOCUMENTS

| | | | |
|---|---|---|---|
| 3,748,015 | 7/1973 | Offner | 350/55 |
| 4,151,512 | 4/1979 | Riganati et al. | 340/146.3 |
| 4,210,899 | 7/1980 | Swonger et al. | 340/146.3 E |
| 4,428,676 | 1/1984 | Chastang et al. | 356/354 |
| 4,537,484 | 8/1985 | Fowler et al. | 354/62 |
| 4,568,178 | 2/1986 | Rios | 355/40 |
| 4,652,116 | 3/1987 | Rios | 355/40 |
| 4,690,554 | 9/1987 | Froelich | 356/71 |
| 4,746,203 | 5/1988 | Nishioka et al. | 359/834 |
| 4,925,300 | 5/1990 | Rachlin | 356/71 |
| 5,109,427 | 4/1992 | Yang | 382/4 |
| 5,146,102 | 9/1992 | Higuchi et al. | 356/71 |
| 5,230,025 | 7/1993 | Fishbine et al. | 382/4 |
| 5,233,404 | 8/1993 | Lougheed et al. | 356/71 |

FOREIGN PATENT DOCUMENTS 3292578  12/1991  Japan ............................ 382/127

OTHER PUBLICATIONS

Chapter 12 entitled "Image Formation and Light Throughput", *Optics*, by K. D. Moller, University Science Books, 1988. (no month).

W. Wetherell, *Applied Optics and Optical Engineering*, vol. X, editor Shannon & Wyant, Academic Press 1987, pp. 177–180. (no month).

*Primary Examiner*—Richard A. Rosenberger
*Attorney, Agent, or Firm*—Knobbe, Martens, Olson & Bear, LLP.

[57] ABSTRACT

Illumination for the platen of a finger receiving imaging prism is provided from a source mounted below the prism and reflected to the platen surface at an angle greater than the critical angle, through a beam folding input prism that is positioned primarily below and behind a front edge of the platen. Transmitting and scanning optics of the system are positioned behind and below the imaging prism, and an output prism is bonded to the imaging prism to receive light reflected from the platen, to shift the path of this reflected light downwardly and to direct it rearwardly toward system optics. The beam from the output prism is fed through an F-Theta scanning lens to a scanning mirror mounted on a scanning galvanometer that causes the fingerprint image to precisely scan across a linear array of print camera sensors that are repetitively sampled to provide a readout of the entire surface of the prism platen for reading a slap print. For a roll print, a portion of the beam is sent to a linear array of sensors of a roll camera to provide an estimate of position of the line of contact of the finger during its rolling motion over the platen. The estimate controls the galvanometer and scan mirror to align the image of the line of contact of the rolling finger precisely with the linear array of the print camera sensors.

2 Claims, 4 Drawing Sheets

FINGERPRINT IMAGING

The present application is a continuation-in-part of the co-pending application for SCANNING FINGERPRINT READING, Ser. No. 08/404,931, filed Mar. 16, 1995, assigned to the assignee of the present application. The disclosure of this co-pending application is incorporated herein by reference as though fully set forth.

BACKGROUND OF THE INVENTION

1. Field of the Invention

The present invention relates to the reading of fingerprints, and more particularly concerns an unique configuration of an input prism assembly and a precisely controlled scanning mirror.

2. Description of Related Art

Fingerprint identification is becoming increasingly automated, and as advantages of automatic fingerprint identification systems become more apparent through widespread use, automated fingerprint identification systems are becoming more common and more widely used. Automated fingerprint identification systems input an electronic representation of an unknown fingerprint for use in selection of one or more matching prints from a massive body of stored electronic representations of many fingerprints. Yet, despite the extent and sophistication of automated fingerprint matching, fingerprints still are captured and recorded by old and conventional procedures utilizing ink, ink pad, and roller to provide an inked impression which is scanned to form a digital electronic representation for storage or comparison. These conventional procedures are inconvenient, slow, and, in many cases, inefficient. They frequently fail to record adequate definition of certain details, singularities and minutiae, that are employed in fingerprint identification and matching processes.

Various types of optical systems have been suggested for automatically capturing and recording a print without use of card and ink, but these systems fail to provide a print record that will meet established criteria, such as specifications established by the Federal Bureau of Investigation. These criteria must be met for efficient and effective input to the automated print identification and matching equipment. Prior optical reading systems produce output images that are unacceptably distorted and lacking in satisfactory definition and resolution.

Prior optical fingerprint imaging apparatus are difficult or inconvenient for use, require special handling, finger positioning and finger motion techniques, or are expensive and complex, while failing to provide fingerprint images that meet established criteria. For example, the patent to Fowler et al., U.S. Pat. No. 4,537,484, requires a finger to be placed in a hollow cylindrical trough and has a driven light source that rotates around the trough. The patent to Yang, U.S. Pat. No. 5,109,427, employs a complex system for deriving a hologram that requires complicated and expensive optics. The imaging device of the patent to Rachlin, U.S. Pat. No. 4,925,300, involves a conical transparent surface that can accept only a single finger at a time. The patent to Froelich, U.S. Pat. No. 4,690,554, employs auto correlation requiring a pair of independent identical relay lens systems. The patents to Rios, U.S. Pat. Nos. 4,568,178 and 4,652,116, each employs a camera with one or more lens to photocopy impressions made by ridges on the tips of fingers.

These patents provide for arrangements to contact the finger that are for the most part significantly different than the widely and commonly used inked pad surface. The long used inked pad technique makes a slap print by placing all four fingers flat on a single surface or makes a roll print by individually rolling each of the several fingers of a hand over the surface about the finger longitudinal axis. Persons experienced in obtaining fingerprints by the standard ink and pad format require retraining and may very well experience difficulty in using different types of input devices such as the above-identified optical input systems. This may result in greater time for taking fingerprints and also may increase the making of unacceptable prints. The prior art fails to provide a finger pressing surface having a front edge that is at an upper and forwardmost portion of the surface and as such is readily accessible to a finger to be placed upon the pressure receiving surface. In taking the print of a single finger, the remaining fingers of the same hand must be bent so that a reasonable part of the length of the single finger being printed can be pressed against a print receiving surface and no other portion of the apparatus will interfere with the knuckles of the bent fingers. Prior optical readers do not provide for such familiar simplified and convenient access of a single finger.

Optical readers require light sources that provide a strong illuminating beam and use lens systems and electronics which cooperate with the finger receiving surface to provide a fingerprint output. Packaging of the illumination source, image transmitting optics, and electronics is difficult to achieve without sacrificing convenience of finger access or without including parts that interfere with knuckles of the fingers not being printed. It is even more difficult to locate non-interfering light source and transmitting optics where total internal reflection at the platen requires certain critical angles of illumination.

Some prior optical systems have employed a large mirror to control direction and position of light exiting the imaging prism. Such a mirror requires a kinematic mount that needs to be adjusted during product shipment. Cost and labor for such mirror mounting is great. Realignment of the mirror at the installation site is not acceptable.

Accordingly, it is an object of the present invention to provide for optical fingerprint imaging that minimizes or avoids problems of the prior art.

SUMMARY OF THE INVENTION

In carrying out principles of the present invention in accordance with a preferred embodiment thereof, a fingerprint imaging system comprises an imaging prism having a platen face, an input face and an output face, and an illumination source for directing an illumination beam at the imaging prism. A beam folding prism is interposed between the illumination source and the input face for directing the illumination beam through the input face to the platen face.

According to a feature of the invention, the beam folding prism includes first and second reflective faces, of which the first reflective face is positioned at the front of the imaging system and oriented to incline downwardly and rearwardly to facilitate access of a hand carrying a finger to be printed.

According to another feature of the invention, an output prism is fixed to the imaging prism output face for directing light exiting the imaging prism through its output face rearwardly of the imaging prism along an axis below the platen face. Thus the input prism assembly and its illumination system is arranged so that the platen face of the imaging prism has a front edge that forms an uppermost and forwardmost portion of the imaging prism assembly, thereby minimizing interference with knuckles of a hand of a finger being printed.

According to still another feature of the invention, an optical image formed at the platen face of the imaging prism is scanned over a linear CCD array by a mirror that is accurately driven to precisely controlled positions of angular orientation by means of a scanning galvanometer drive.

DESCRIPTION OF PREFERRED EMBODIMENTS

Figure 1:
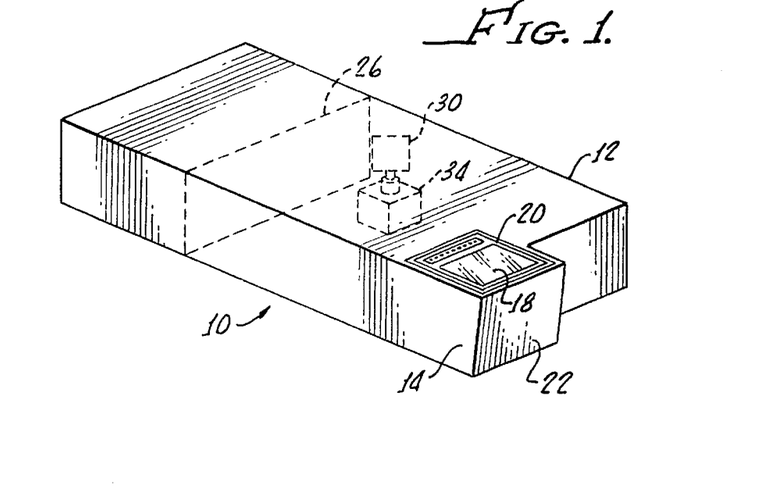
FIG. 1 is a pictorial view of a system housing of a fingerprint reading apparatus employing features of the present invention.

Illustrated in FIG. 1 is a housing, generally indicated at 10, that encloses and supports a fingerprint imaging and reading system embodying principles of the present invention. The housing incorporates a generally rectangular housing section 12 having a forwardly projecting platen housing section 14 that carries an imaging prism assembly 16 (see FIGS. 2 and 3) that includes an upper exposed platen face 18 circumscribed by a bezel 20. A front wall 22 of the housing platen section 14 slopes downwardly and toward the rear, or inwardly, from the upper exposed platen face 18. The platen face 18 is the face of an imaging prism, to be described below, upon which is positioned a finger or fingers of which prints are to be obtained.

A rear section 25 of the housing that is positioned behind the dotted line 26 contains electronics including circuit boards and the like for control of certain of the electronic portions of the system.

In an exemplary arrangement total dimensions of the housing 10 are 27.5 inches long from the front of the platen section to the end of the electronic section 25, 12 inches wide, and 5 inches deep. Bezel 20 encompasses a rectangular platen face area of approximately 2 inches by 4 inches. The interior of the housing mounts a set of optics, to be described below, and including a scan mirror 30 (FIG. 1) that is positioned within the housing near a right rear corner thereof. Fixed to and depending from the bottom of the housing at the right rear corner is a scanning galvanometer 34, such as a series G-100 or series G-300 galvanometer scanner made by General Scanning, Incorporated of Watertown, Mass. The galvanometer includes an output shaft 36 to which is fixedly secured a mirror mounting clamp 38 that fixedly carries mirror 30. The galvanometer provides for precision control of the angular orientation of the mirror 30 about the axis of the galvanometer shaft. This angular position and mirror deflection are precisely proportional to drive current or voltage applied to the galvanometer. This precision galvanometer cooperates with an F-Theta lens of the optics (to be described below) to provide for precision angular scanning.

Significant aspects of the present invention are embodied in the configuration, orientation and positioning of the input prism assembly 16, the illumination source therefor, and the overall packaging of the input prism assembly in the housing. The unique configuration of prism assembly and illumination system provides an upper front corner, generally indicated at 40 in FIG. 4, to be positioned at the uppermost and forwardmost portion of the imaging section 14. This allows a single finger being printed, such as finger 42 of FIG. 4, to be placed upon the platen surface 18 while knuckles of folded fingers 44 of the same hand that carries the finger 42 encounter minimum interference with the forward wall 22 of the housing, which, as previously mentioned, is inclined downwardly and rearwardly (toward the left as viewed in FIG. 3) from the upper front corner 40.

Figure 4:
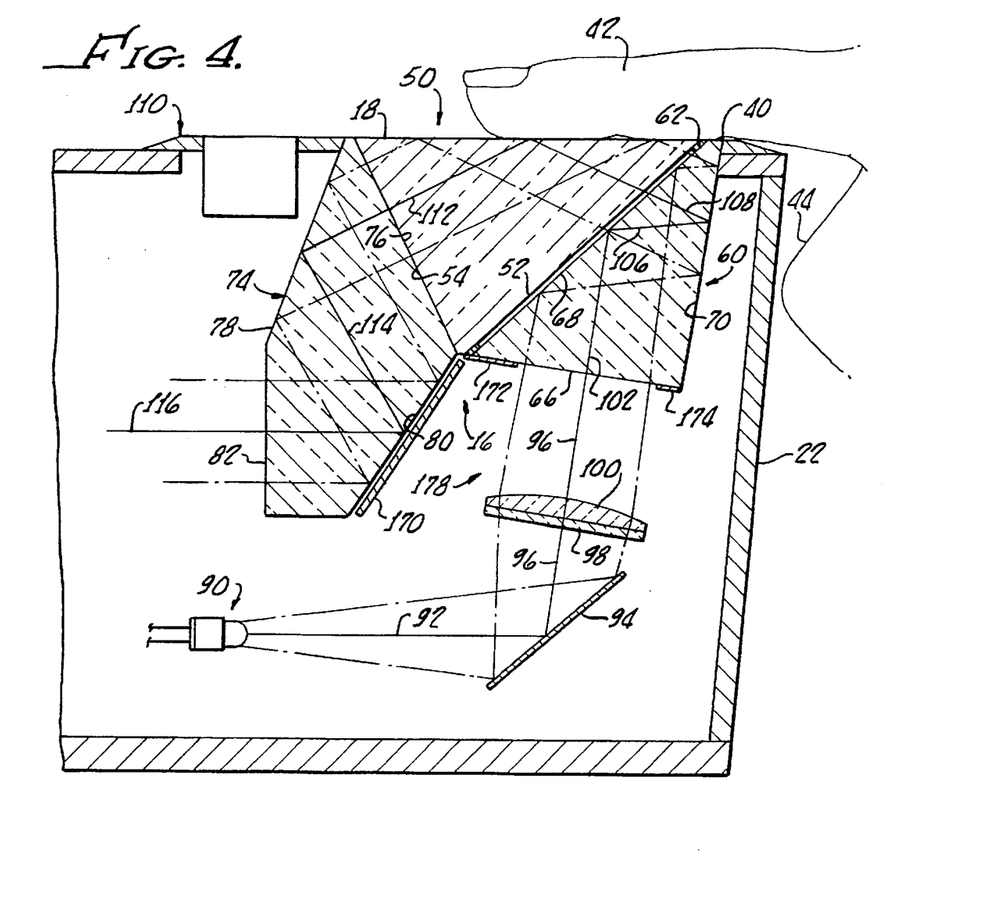
FIG. 4 is a side elevation view of the optical prism assembly and its input illumination.
Figure 5:
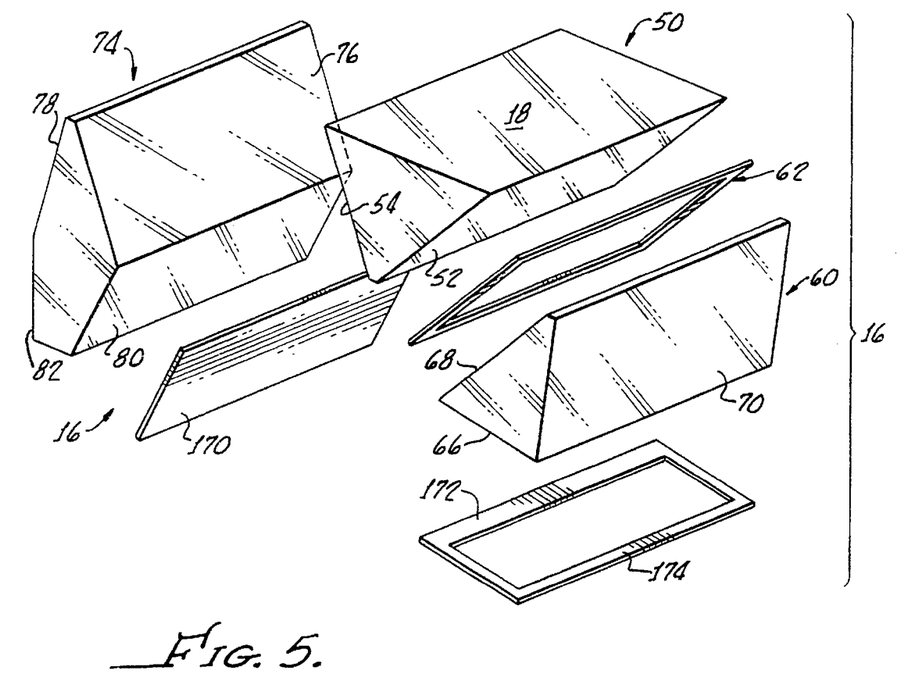
FIG. 5 is an exploded pictorial view of the components of the input imaging prism assembly.

As best shown in FIGS. 4 and 5, input prism assembly 16 includes an input imaging prism 50 having a generally triangular cross-section and a platen face 18, which in the described arrangement is oriented in a generally horizontal plane when mounted in the housing 10. The imaging prism 50 has a front or input face 52 and a rear or output face 54, both of which are generally rectangular, as is platen face 18. A triangular beam folding input prism 60 is bonded to the imaging prism front face 52 through an interposed shim 62. Beam folding input prism 60 is positioned at the front face 52 of imaging prism 50 and generally below the platen face 18. The beam folding input prism includes an input face 66, a first reflective face 68 (actually both reflective and transmissive, as will be described below), and a second reflective face 70. The latter is externally coated to provide for total reflection. First reflective face 68 of the prism 60 is bonded to an open, rectangular and largely perimetrical shim 62, which in turn is bonded to the input face 52 of imaging prism 50. With use of the perimetrical shim, which has a thickness in the order of 0.020 inches, the first reflective face 68 of input prism 60 is positioned close to but slightly spaced from the imaging prism input face 52, thereby providing an air gap. Thus, presence of the shim creates a prism/air interface.

To complete the prism assembly, pentagonal cross-section output beam folding prism 74 is bonded directly to the output face 54 of the imaging prism 50. Output prism 74 has an input face 76 directly in full face to face contact with and coextensive with the output face 54 of imaging prism 50. The output prism also includes first and second internal reflective faces 78,80 and an output face 82, which may be generally vertically disposed in a presently preferred arrangement. The several faces of the output prism 74 are also rectangular, having the appropriate width and length substantially equal to the length of the platen face 18 of the imaging prism 50.

Figure 7:
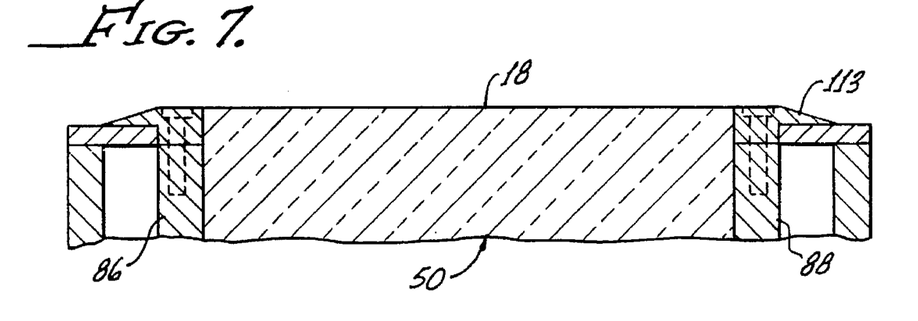

The prism assembly 16 is mounted to the platen housing section 14 by having the end faces of the several prisms bonded to and between a pair of side plates 86,88 (see also FIG. 7). All of the prisms have end faces which are all mutually co-planar and all lie in a plane contiguous to the inner surface of one of the side plates 86,88, to which they are adhesively bonded. The side plates are fixedly secured by suitable fasteners to other portions of the housing, thereby fixedly and rigidly mounting the entire prism assembly to the forwardmost and uppermost portion of the platen housing section 14.

Mounted within the housing at the bottom of the platen section 14 is an illumination system comprising a linear array of light emitting diodes 90, having a total length, for the line of diodes, substantially equal to the length of the prism. The line of diodes extends in a horizontal direction perpendicular to the plane of the paper, as seen in FIG. 4. The light emitting diodes generate a wide (horizontally) illumination beam that is relatively narrow vertically and which is projected along an axis 92 toward a folding mirror 94 mounted at a lower and forward portion of the platen housing section 14. The mirror 94 is arranged to bend the illumination beam and project it upwardly along an axis 96 inclined upwardly and forwardly toward the input face 66 of the beam folding input prism 60, as can be seen in FIG. 4. The LED illumination beam reflected from mirror 94 is first diffused in two mutually orthogonal directions, both orthogonal to the axis 96, by means of a diffuser plate 98 that is bonded to the input face of a cylindrical lens 100, having a generally rectangular configuration that is perpendicular to the axis 96. Both the diffuser and cylindrical lens 100 have a length substantially equal to the length of the input imaging prism 50. The input illumination system components and the prisms of the prism assembly are configured and arranged, and the angles of the prism faces chosen so that the illumination beam from cylindrical lens 100 is directed along axis 96 at an angle that is nearly perpendicular to prism input face 66. Axis 96 is oriented so that the illumination beam impinges upon first reflective surface 68 of the beam folding prism 60 with an angle of incidence greater than the critical angle (41.315 degrees as described below) between the prism material and the external air in the gap between prisms 50 and 60.

The beam folding input prism 60 twice folds the beam to direct it along an optical path, having a first leg 102 from its input face 66, to the first reflective (reflective/transmissive) face 68, from which it is totally internally reflected to a second reflective face 70 of the input prism along a second leg 106 of the folding beam path within the prism 60. The second reflective face 70 is externally coated with a reflective material to provide for total reflection from this surface at the smaller angle of incidence of path leg 106. The input illumination beam is totally reflected from surface 70 along a third optical path leg 108 toward and through the first reflective (almost totally transmissive at the smaller angle of incidence) face 68 of the input prism and toward and through the input face 52 of the imaging prism 50. The prism angles are such that the optical path leg 108 is nearly perpendicular to the first reflective face 68 of prism 60 and to the input face of prism 50, and thus is almost entirely transmitted through these faces and through the glass/air interface between the prisms 60 and 50.

Path leg 108 is directed toward the platen face 18 of the imaging prism at an angle (about 65 degrees) greater than the critical angle between the glass and ambient air at the platen face. Accordingly, light is totally internally reflected from the platen face along an optical path leg 112 when air or water is at the platen face. Total internal reflection is defeated by skin in contact with the platen face. Light in path leg 112 travels through the rear output face 54 of the imaging prism 50, to the first reflective face 78 (see FIGS. 4 and 5) of the output prism 74. Using a BK7 optical glass for all of the prisms as an example, the glass/air interface has a critical angle for total internal reflection of 41.315 degrees at a 645 nanometer wavelength. The critical angle is 61.65 degrees when the external medium is water (as on a wet finger pressed against platen 18) and is 72.0 degrees when the external medium is skin. Use of an input illumination angle of between 61.65 and 72 degrees, therefore, will cause both air and water to produce total internal reflection while skin will defeat total internal reflection.

The orientation of output face 54 of imaging prism 50 is such that it is substantially perpendicular to optical path leg 112. First reflective face 78 of output prism 74, which may be coated to provide for full reflection, reflects the output beam along a second path leg 114 within the output prism to impinge upon the second reflective face 80 of the output prism. The latter may be coated to provide for full reflection, and in turn reflects the output beam along a final output path leg 116 which is substantially normal to the output face 82 of the output prism and is aligned with the optical input axis of an optical transmission system, to be described in detail below, that handles the optical image totally internally reflected from the platen surface 18.

The output beam on optical path leg 116 contains an optical image which, when focused, provides a reflection map of the glass/skin interface, from which fingerprint ridge definition is derived. In the absence of skin pressed along the platen surface, the prism/air interface provides a critical angle for total internal reflection. Where ridges of a finger are pressed against the platen 18, total internal reflection of the prism is defeated so that light from those points at which the finger ridges touch the platen is not totally internally reflected, but, instead, most of the light at such areas passes out of the prism through the face 18 and is absorbed by the finger or fingers. Accordingly, an output light beam is passed through the output prism along final optical path leg 116 and provides a pattern of dark (low intensity light) and light (high intensity light), where the dark represents the fingerprint pattern. This is a direct analog of an inked fingerprint.

Light baffles 170,172,174 (FIG. 4) are bonded to external surfaces of second reflective face 80 of the output prism 74 and to the external surface of the input face 66 of beam folding input prism 60 to prevent entry of stray light into the system.

The three prisms of the described prism assembly are all bonded together during assembly and fabrication, require no alignment at system level, and cannot lose alignment during product shipment. The prism assembly also slightly reduces the optical path required by the scan lens and thereby permits slightly greater design freedom for the scan lens. The substitution of the bonded output prism for a large output mirror that is required in the absence of the output prism also provides additional space for locating the input illumination system.

Figure 3:
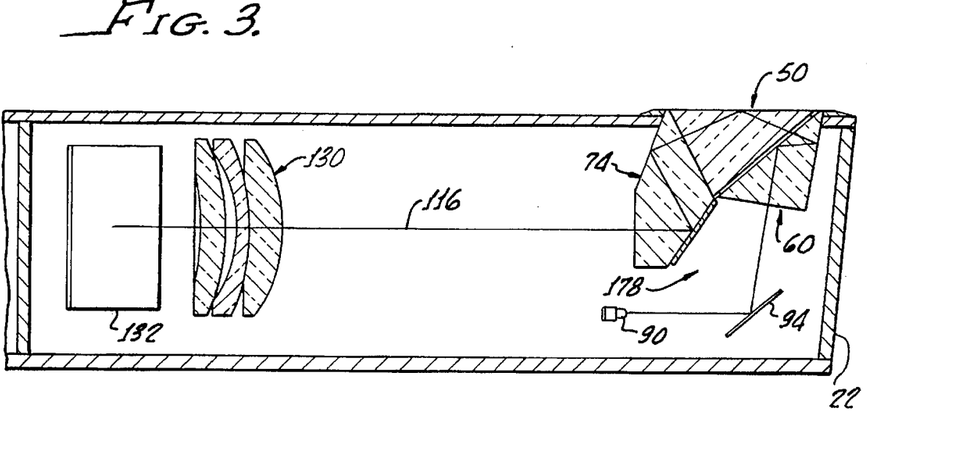
FIG. 3 is a side elevational view showing arrangement of input optics and illumination and portions of the optical image transmission system.

One significant advantage of the described input illumination system can be understood with respect to FIGS. 3 and 4. This advantage is the provision by the described system of a highly directional input illumination beam which is directed in a precise narrow angle along the path leg 108 of FIG. 4. The arrangement of diffuser 98 and cylindrical lens 100, together with the input prism 60, provides an input illumination for total internal reflection at the platen that has a narrowly concentrated angular distribution and is focussed but not diffused as it enters the imaging prism.

Figure 6:
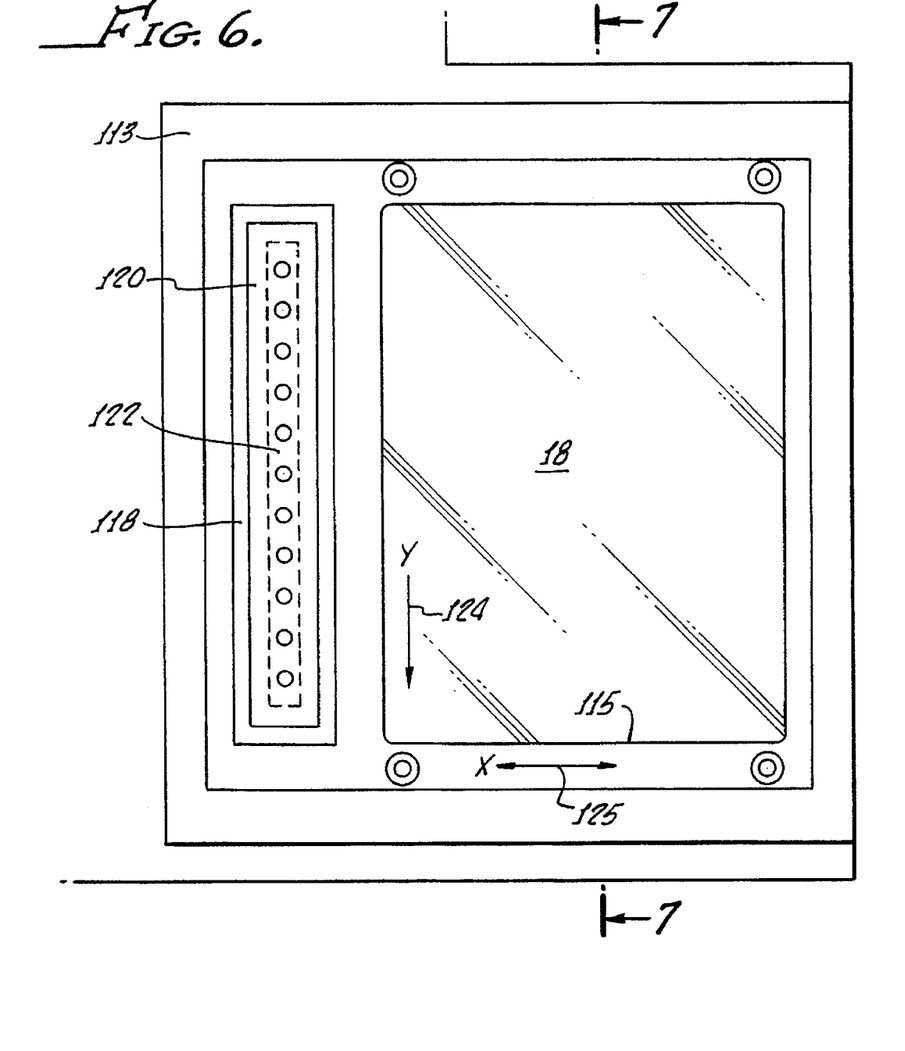
FIGS. 6 and 7 are top and front views, respectively, of a bezel that circumscribes the platen face of the input prism.

The bezel 20 is fixedly secured to the side plates 86,88 and circumscribes the platen face 18 of the imaging prism 50 (see FIGS. 6 and 7). The bezel includes a perimetrical tapered or chamfered edge 113 that circumscribes the platen face, leaving a clear opening 115 of platen face 18 that is readily accessible for accepting a finger or fingers to be pressed against it. The bezel extends rearwardly of the input prism 50 and includes a narrow laterally elongated display opening 118, having a transparent glass upper surface 120 covering an elongated array of light emitting diodes, LED's, 122. These LED's are positioned and electrically actuated in a manner to be set forth in detail below to indicate position of a single finger during the taking of a roll print. As a single finger is rolled across the platen face 18 in a Y direction, as indicated by scan arrow 124, the LED's are arranged to light up, one at a time, each being lit when the line of contact of a finger during a roll print is positioned at the lateral position of the individual LED.

The described prism assembly includes separate imaging prism 50 and a separate output prism 74 which are bonded face-to-face at faces 54 and 76. It will be readily appreciated that in a possible alternative configuration, the imaging prism 50 and output prism 74 may be made integral with one another, completely eliminating the adjoining separate faces 54, 56 and forming a single monolithic prism to which the input prism 60 is bonded just as previously described. In such a monolithic integral prism that includes the configurations of prisms 50 and 74, the second reflective face of the part that corresponds to face 80 of the illustrated output prism 74 would be coplanar with the input face 52 of the imaging prism for ease of manufacture. Because of such change of angle of the second reflective face, the face corresponding to first reflective face 78 would also have its angle changed to insure that the final output leg along axis 116 is appropriately directed.

Figure 2:
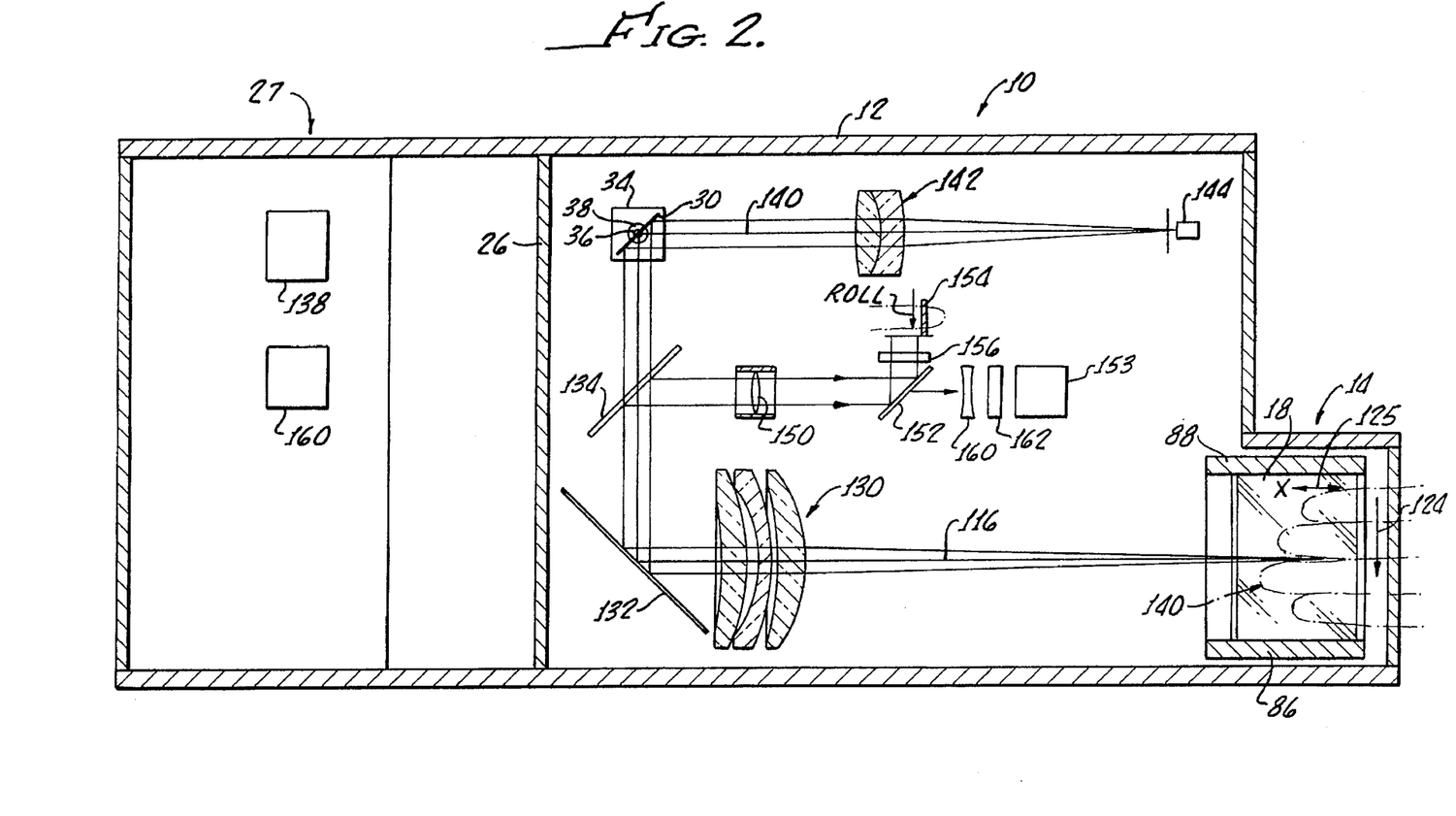
FIG. 2 is a plan view of the relative orientation and position of optical components in the system housing of FIG. 1.

The optical axis, light path 116, of the output beam from output prism 74 is directed substantially horizontally and rearwardly, being positioned below the horizontal platen surface 18 and above the substantially horizontal axis 92 of the illumination from the light source 90. Output axis 116 is coincident with the optical axis of a multi-element scan lens 130 to which the image is directed from the output prism 74 (FIGS. 2 and 3). Light from the scan lens 130 is directed to a turning mirror 132 and thence through a first beam splitter 134 (FIG. 2) to the scanning mirror 30 that is also illustrated in FIG. 1. As previously mentioned, the mirror 30 is mounted on scanning galvanometer 34. Scan mirror 30 is mounted to the galvanometer 34 for rotation about the axis 36 of the vertically oriented output shaft of the galvanometer, which axis lies in the plane of the reflective surface of the mirror, extending perpendicular to the plane of the paper as viewed in FIG. 2. Mirror position is controlled by the galvanometer, and an electronic control system 138, schematically indicated as being positioned within the electronic section 27 of the housing. The galvanometer is capable of driving the mirror at a constant rotational speed or precisely to a desired angular position under control of a position input command signal to the controller 138, as will be more particularly described below.

The image of platen face 18 is reflected from scan mirror 30 along an optical axis 140 to a focusing lens 142 which focuses the image in the plane of a print camera 144. Print camera 144 comprises a fixedly positioned one dimensional linear array charge coupled device (CCD) whose sensors extend in a direction that may be termed a "cross-scan direction", namely, a direction perpendicular to the direction of the scan produced by the rotation of scan mirror 30. The scan direction is indicated in FIGS. 2 and 6 by the Y direction arrow 124. The cross-scan direction is indicated by the X direction arrow 125.

The print camera 144 is part of the first of three optical paths in this system. The first or print scan path includes the prism 16, lens 130, scan mirror 30, focus lens 142 and the print camera 144. A second optical path is a live view monitor path to enable live visual monitoring of the print capture process. A third optical path is a roll print tracking path that includes a second linear array CCD.

Referring to the illustration of the prism assembly shown in FIG. 2, the drawing shows a top view of the platen 18 and indicates the scan as taking place in the Y direction, as indicated by arrow 124. A cross-scan direction, indicated by arrow 125, is perpendicular to the scan direction and extends in an X or horizontal direction as viewed in FIG. 2. A finger or fingers are placed on the platen 18 with their longitudinal extent parallel to the cross scan or X direction (see FIGS. 2 and 3), and the system is arranged by means including rotation of the scanning mirror to effectively move the image (at the print camera 144) from one side to the other of the platen 18 (vertically as viewed in FIG. 2) in the direction of scan arrow 124. A "slap" print or flat hand print of all four fingers is illustrated in dotted lines at 140 in FIG. 2 to indicate orientation of the fingers relative to the platen. The linear array CCD of the print camera 144 extends in the cross-scan or X direction so that as the entire image is caused to scan (by rotation of the scan mirror 30) in the Y direction, the entire image will move across the CCD array in the Y direction (vertically as viewed in FIG. 2). Electrical output information is extracted from the sensors of the CCD, processed, and then appears as a serial bit stream of digital data that defines a digitized version, in two dimensions, of all the pixels of the fingerprint. Preferably, to meet certain specifications established for instruments of this type, the digitized output defines pixels that are positioned adjacent to each other on the platen at five hundred per inch, in both X and Y. Preferably the mirror scan rate causes the full image of platen 18 to traverse the linear array of print camera 144 with a duration on the order of a second (about one full traverse per second).

The live view monitor path is the second optical path. In order to enable an operator of this reader to monitor the fingerprint imaging process as it occurs, and to determine the nature of the operation and the state and quality of the fingerprints being acquired, a portion of the image light from scan lens 130 is reflected from beam splitter 134 (FIG. 2) through a positive cylindrical lens 150, through a second beam splitter 152, through a negative cylindrical lens 160 and an imaging lens 162, and thence to a monitoring video camera 153, which may take the form of a two-dimensional CCD that provides an input to a CRT monitor (not shown). The two-dimensional CCD camera 153, which may be a two-dimensional rectangular array of sensors, enables generation of a visual display of the object on platen 18 at all times so that an operator can determine if all four fingers are properly placed on the platen or that a single finger is properly rolled across the platen.

Fingerprints are taken in two general types. A first type is a full finger scan, often termed a "slap print", in which all four fingers are placed together on the platen, as indicated in FIG. 2. For this slap print, while the fingers are in a fixed position on the platen an image of all four fingerprints is read together as a single unit by the reading apparatus. The apparatus and operation described to this point reads such a "slap print".

Fingerprints are also provided in a second type of print as prints of individual fingers, often termed "roll prints", because these prints are taken of a single finger at a time, with the finger caused to roll across the platen surface about the longitudinal axis of the finger. As the single finger is rolled across the platen, at any instant there is a relatively narrow line of contact, extending longitudinally of the finger, between the finger and the platen. This line of contact moves across the platen (in Y direction) as the finger rolls. For reading out a roll print, it is desired to align the image of this line of contact of the finger with the longitudinal extent of the linear one-dimensional print camera CCD array 144 (FIG. 2). Thus, if the longitudinal extent (in X) of the finger during its rolling motion across the platen is at a given Y position, the angular position of the scanning mirror 30 is precisely controlled by its galvanometer drive so that the particular portion of the image that contains the line of contact of the finger with the platen (at such Y position) is effectively aligned with the one-dimensional line of the CCD print camera 144. To this end an estimate of the Y position of the line of contact of the finger during a rolling print operation is obtained by reflecting part of the image beam from the second beam splitter 152, from which it is reflected through a lens 156 to the roll camera CCD 154. The fixedly positioned linear array CCD 154 is oriented across the image in the Y direction. That is, the array 154 of the roll camera is oriented in the scan direction and transverse to the longitudinal axis of a finger of which a roll print is being made.

At each Y position of the finger in its roll scan there is obtained from the roll camera an optical signal that is processed to yield an electrical position estimate signal having a magnitude that represents the Y position of the longitudinal axis of the finger during the course of its rolling across the imaging prism platen. This position estimate signal is fed from the roll camera 154 as a position control input to the scan mirror actuator and control circuit 138, which sends to the galvanometer an electrical position signal having a current magnitude that is proportional to the Y position of the rolling finger. This electrical position signal causes the galvanometer to rotate the mirror through an angle that is precisely proportional to the magnitude of the current applied to the galvanometer. Accordingly, the mirror is rotated about its axis to an orientation that directs the image of platen 18 (including a finger pressed thereagainst during a roll print operation) so that the image of the line of contact of this finger during its rolling action is always aligned with the linear array of the print camera 144.

This same position estimate signal is fed to a controller 160 (which may be part of the controller 138) in the electronic section 27 that selectively and individually activates the LED's of the roll display 122 (see FIG. 7) so that as the rolling finger, during its motion across the platen, reaches the Y position of each individual one of the LED's of the LED array 122, that particular LED, and only that LED, is activated, thereby providing a moving visual display of the sensed position of the finger during a roll print.

The described optical system employs dual telecentricity in that the scan mirror 30 is positioned at a common focal plane aperture stop for both the scan lens 130 and the focal lens 142. The mirror 30 is positioned at the output focal plane of the scan lens 130 and is at the input focal plane of the focus lens 142.

The optical arrangement provides an image free of distortion except for anamorphic magnification with a scan or Y direction magnification in an exemplary system of 0.53 and a cross-scan or X direction magnification of 0.265. The magnifications in the two directions are made effectively equal to each other by controlling the scanning rate of the mirror 38. The Y or scan direction magnification is made effectively equal to the cross-scan magnification by increasing the scan rate. This is done empirically by adjusting the scan rate (by controlling the rate of current increase to the galvanometer) until an image of proportions equal to proportions of the object is obtained. For this empirical adjustment an object of known geometry is placed in the object plane and the scan rate is adjusted until the image (as provided from the output of the print camera CCD) has the same geometry as the object.

In order to ensure that the angle of entry of light from the object on platen 18 into the scan lens 130 is proportional to the lateral displacement of the image from the optical axis, the scan lens 130 is an F-Theta lens, which, for large entry angles, as is well known, produces a scan displacement in the horizontal direction that is a precisely linear function of the angle of entry of light from the object lens. This angle, in the described system, is a linear function of the rotation angle of the scan mirror. Thus, the F-Theta lens cooperates with the precision angular control and drive afforded by the scan mirror galvanometer drive to provide an overall angular scanning of surprising and unexpected precision.

The apparatus described above provides for optical imaging of fingerprints by use of an input imaging platen that, insofar as the operator and the person whose prints are being taken are concerned, is basically the same as the widely used and commonly known ink and pad arrangement. A combination of input prisms allows the platen face of the imaging prism to be conveniently accessible and provides an upper front corner of the input prism assembly that is readily adapted to accept a single finger without undue interference with knuckles of other fingers of the same hand, which other finger are bent when the finger being printed is extended. The arrangement of the input prism assembly provides a recess 178 (FIGS. 3 and 4) that is below and slightly forwardly of portions of the imaging prism 50. The location of this recess 178 facilitates compact packaging by providing an area in which the input illumination lens 100 and diffuser 98 are mounted. This recess, as best seen in FIG. 4, is below the input face 66 of input prism 60 and toward the right of the second reflective face 80 of output prism 74. As part of this compact packaging the output prism 74, which is positioned behind and at the rear or output face 54 of the imaging prism 50, extends significantly downwardly, well below the platen surface 18, but, nevertheless, provides its output beam along axis 116 that is below platen 18 and is substantially parallel to but above the horizontally directed input illumination beam and input illumination lighting devices 90,92. Importantly, the arrangement includes an input prism 60 having a forwardmost face, namely the second reflective face 70, that extends downwardly and rearwardly from the platen to avoid interference with knuckles of a hand having an extended finger pressed on the platen.

What is claimed is:

1. A fingerprint reader comprising:
   an imaging system for generating an optical beam defining an optical image of a fingerprint;
   a scanning galvanometer;
   a scanning mirror mounted on said galvanometer for angular movement through a plurality of positions;
   a linear array of sensors;
   an optical system for directing said optical image at said scanning mirror for reflection to said linear array of sensors, said optical system comprising;
   an F-Theta scan lens in which lateral displacement of the image from the optical axis is proportional to the angle of entry of light to the lens over a relatively large entry angle;

a focus lens, said scan lens and said focus lens having a common focal point between them, said scanner mirror being interposed between said scan lens and said focus lens at said common focal point;

a mirror controller for energizing said galvanometer to scan said mirror about a scan axis and scan said optical image across said linear array of sensors;

a means for generating a scan position command signal in accordance with a position of said finger as said finger moves over said platen, wherein said mirror controller and said galvanometer are responsive to said scan position command signal to drive said scanning mirror to an angular position precisely proportional to said scan position command signal.

2. The fingerprint reader of claim 1 wherein said means for generating a scan position signal comprises a linear array of roll print sensors extending in a direction parallel to the extent of a finger on said platen, and means for directing a portion of said optical beam to said linear array of roll print sensors.

* * * * *